(12) United States Patent
Courser

(10) Patent No.: US 7,607,365 B1
(45) Date of Patent: Oct. 27, 2009

(54) DRIVE MECHANISM FOR AN EXTENDABLE MEMBER

(75) Inventor: Duane O. Courser, Niles, MI (US)

(73) Assignee: Liftco, Inc., Elkhart, IN (US)

( * ) Notice: Subject to any disclaimer, the term of this patent is extended or adjusted under 35 U.S.C. 154(b) by 127 days.

(21) Appl. No.: 11/696,823

(22) Filed: Apr. 5, 2007

(51) Int. Cl.
F16H 27/02 (2006.01)

(52) U.S. Cl. .................. 74/89.11; 52/67; 296/26.09; 296/171

(58) Field of Classification Search .............. 74/89.17, 74/395–403, 9, 422; 49/396; 296/26.09, 296/26.13, 165, 171, 175; 52/67
See application file for complete search history.

(56) References Cited

U.S. PATENT DOCUMENTS

| | | | | |
|---|---|---|---|---|
| 4,785,685 A | * | 11/1988 | Kobayashi et al. | 74/498 |
| 5,355,624 A | * | 10/1994 | Bacon | 49/280 |
| 5,620,224 A | * | 4/1997 | DiBiagio et al. | 296/26.13 |
| 5,902,001 A | * | 5/1999 | Schneider | 296/26.13 |
| 5,983,742 A | * | 11/1999 | Morris et al. | 74/422 |
| 6,293,611 B1 | * | 9/2001 | Schneider et al. | 296/171 |
| 6,494,518 B2 | * | 12/2002 | Kreil et al. | 296/26.01 |
| 6,619,713 B2 | * | 9/2003 | Eichhorn | 296/26.01 |
| 6,619,714 B2 | * | 9/2003 | Schneider et al. | 296/26.13 |
| 6,820,369 B2 | * | 11/2004 | Fenelon | 49/349 |
| 6,896,307 B2 | * | 5/2005 | Nye et al. | 296/26.01 |
| 7,234,747 B2 | * | 6/2007 | Rasmussen | 296/26.01 |
| 2002/0047286 A1 | * | 4/2002 | Nye et al. | 296/26.13 |
| 2002/0152825 A1 | * | 10/2002 | Adams et al. | 74/422 |
| 2006/0082178 A1 | * | 4/2006 | Rasmussen | 296/26.01 |
| 2006/0232088 A1 | | 10/2006 | Herson et al. | |
| 2006/0273606 A1 | * | 12/2006 | Rasmussen | 296/26.13 |

* cited by examiner

Primary Examiner—Richard W L Ridley
Assistant Examiner—Phillip Johnson
(74) Attorney, Agent, or Firm—Botkin & Hall, LLP

(57) ABSTRACT

A drive mechanism having a first and second side plate opposite each other that rotatably hold an engagement shaft and a gear shaft. A rack passes between the gear shaft and engagement shaft. The first and second side plates are allowed to float vertically in a frame. The gear is maintained in constant contact with the rack when the rack is moved vertically within the frame.

8 Claims, 4 Drawing Sheets

DRIVE MECHANISM FOR AN EXTENDABLE MEMBER

BACKGROUND OF THE INVENTION

Slide-out mechanisms are used extensively in recreational vehicles, such as for storage trays, tank carriers and slide-out rooms. When slide-out mechanisms are used for slide-out rooms it is desirable to have such a room be flush with the floor of the main room from which the slide-out room extends. This has been done by allowing the slide-out room to move vertically during its operation such that the slide-out room is supported above the floor of the main room in its fully retracted position, and when it is fully extended it is lowered to the same plane as the floor of the main room. During this process a mechanism that actuates the sliding must compensate for the change in height as the slide-out room is operated. This has been particularly challenging when a rack and pinion mechanism is used to actuate a slide-out room since gear teeth used to engage a rack attached to a slide-out room tend to become disengaged as height of the slide-out room changes. There remains a need to have a slide-out mechanism which compensates for height changes and keeps gear teeth in contact with a mating rack at all times during operation.

SUMMARY OF THE INVENTION

The present invention is a drive mechanism for an extendable member and will have specific but not limited application to a drive device for a slide-out room in a recreational vehicle.

The invention includes an engagement block that maintains a gear in constant contact with a rack. The gear meshes with a first surface of the rack and an engagement shaft maintains rolling contact with a second surface of the rack, which is opposite the first surface. This allows movement of the rack while maintaining contact between the gear and the first side of the rack as the rack, gear, and shaft float or move vertically during movement of the attached member, such as a slide-out room, between extended and retracted positions.

An object of the invention is to provide a drive mechanism that will allow vertical movement of a rack while remaining engaged with a gear or pinion.

Another object of the invention is to provide a drive mechanism for a recreational vehicle slide-out room that will prevent disengagement of the gear from the rack during operation of the drive mechanism while allowing vertical movement of the rack and gear.

Other objects of the invention will become apparent upon reading of the following description of the invention.

DETAILED DESCRIPTION OF INVENTION

Figure 1:
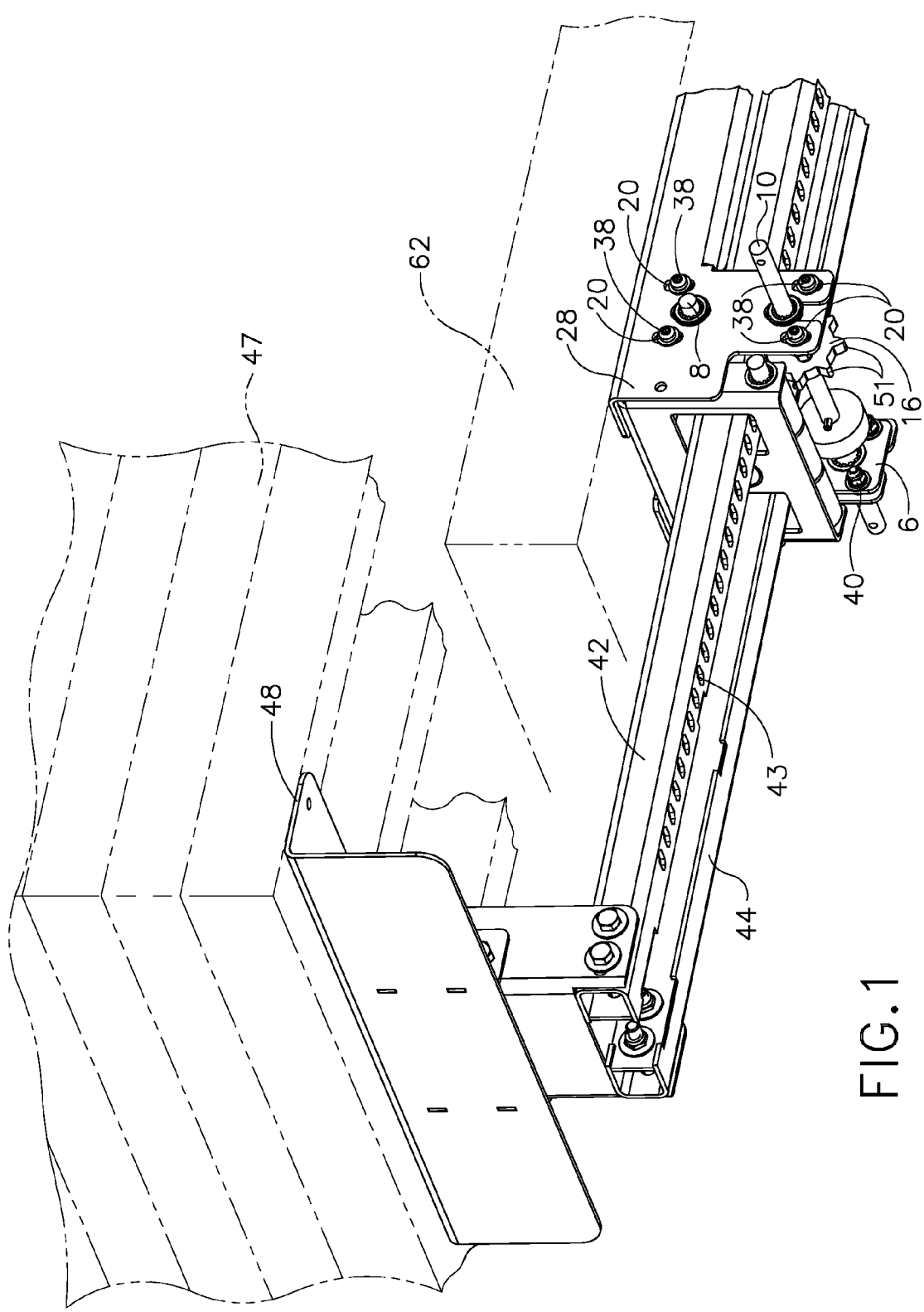
FIG. 1 shows the drive mechanism connected to a slide-out room shown in broken lines.
Figure 2:
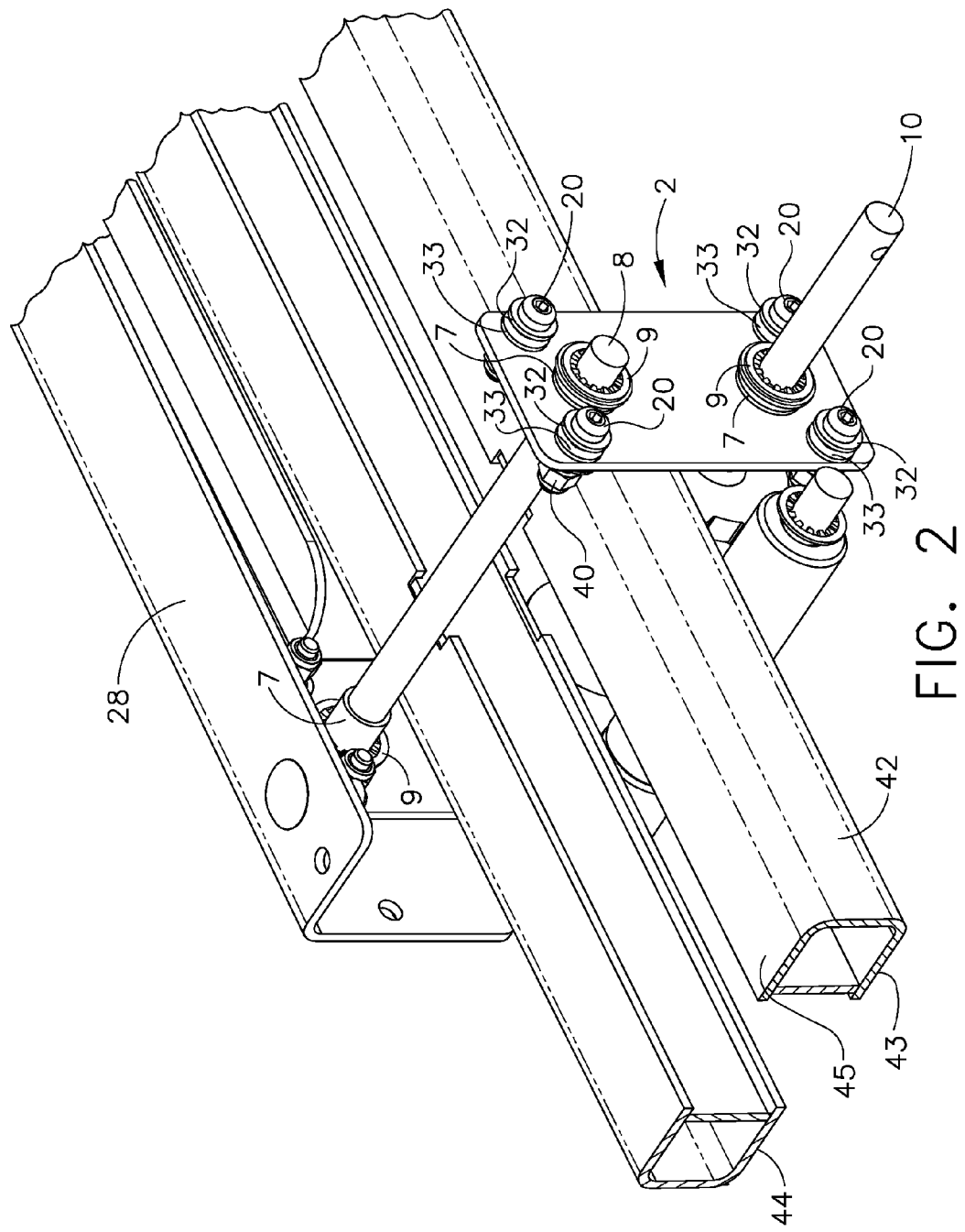
FIG. 2 shows the engagement block of the drive mechanism.

The drive mechanism 1 of this invention includes an engagement block 2 having a first side plate 4 and a second side plate 6 which are parallel and opposite each other. An engagement shaft 8 extends through holes 12 in the first and second side plates 4, 6 and is supported for rotation by bushings 7. A gear shaft 10 extends through holes 14 in the first and second side plates 4, 6 and is supported for rotation by bushings 7. The gear shaft 10 has a pinion or gear 16 mounted to the gear shaft 10 so that it rotates with the gear shaft 10. A support roller 18 is also attached to the gear shaft 10 and rotates with the gear shaft. The gear shaft 10 and engagement shaft 8 are restricted from moving laterally relative to plates 4,6 by retaining clips 9. Although retaining clips 9 are used in the preferred embodiment other means such as cotter pins, or snap rings could be used to prevent lateral movement. The first and second slide plates 4,6 have holes 19 through which shoulder bolts 20 are inserted.

The shoulder bolts 20 protrude through the side plates 4,6 of the engagement block 2 and extend through slots 26 in a frame 28. For purposes of a useful environment, frame 28 is adapted to be secured to the undercarriage of the main living quarters of a recreational vehicle. The gear shaft 10 and engagement shaft 8 extend through slots 30 in the frame 28. In the preferred embodiment washers 33 are placed on the shoulder bolts 20 between the side plates 4,6 and frame 28 and bushings 32 are placed on opposite sides of the frame. The bushings 32 are flanged bushings that extend through the slots 26 in the frame 28 to prevent metal to metal contact and binding. In the preferred embodiment the bushings 32 and washers 33 are made of nylon plastic, but other low-friction materials could be used. Nuts 40 are tightened upon bolts 20 to draw plates 4,6 and frame 28 together sufficiently to connect the parts but to also allow vertical sliding movement of the plates relative to the frame between washers 33 and bushings 32 within slots 26. At the same time the protruding ends of shafts 8 and 10 shift within slots 30 in frame 28. This configuration allows the engagement block 2 to slide vertically within the frame 28.

A rack 42 and attached parallel support rail 44 pass through the engagement block 2 between the gear shaft 10 and engagement shaft 8. The rack 42 and support rail 44 are attached by a bracket 48. The rack 42 has a surface 43 that engages or meshes with gear 16, and support rail 44 is in rolling contact with support roller 18. The opposite surface 45 of the rack 42 and, preferably, the opposite surface of rail 44 are in rolling contact with engagement shaft 8. In the preferred embodiment, the surface 43 of the rack has a series of aligned, longitudinally spaced holes 50 into which the teeth 51 of gear 16 extend. As gear shaft 10 is turned, the rack 42 and attached support rail 44 can be extended or retracted relative to the frame 28. The gear shaft 10 is preferably turned by an electric motor drive. A hand crank may also be provided in case of power failure.

Figure 3:
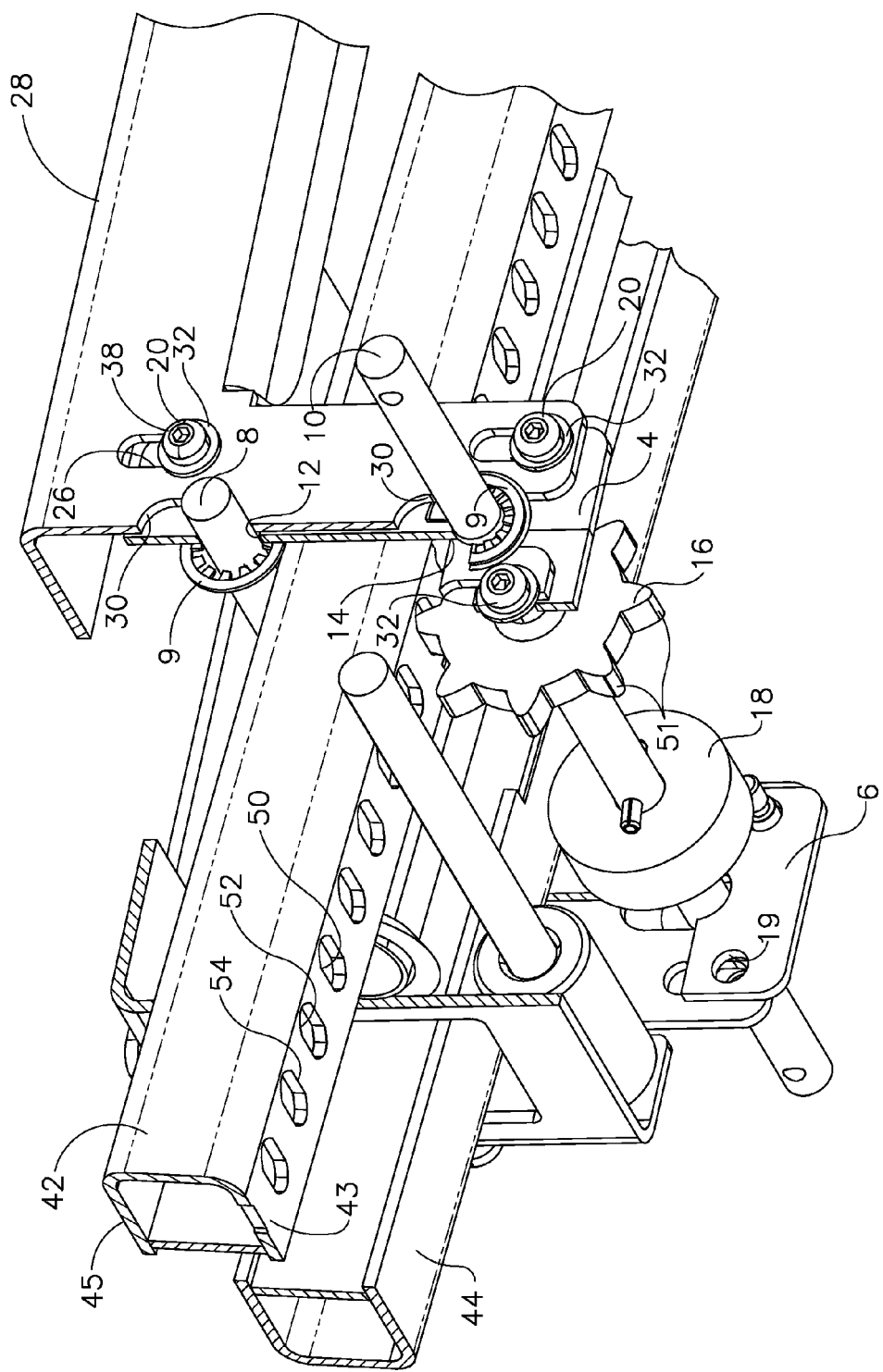
FIG. 3 is a partial sectional view of the drive mechanism when the rack is fully extended with the slide-out room in its extended position.
Figure 4:
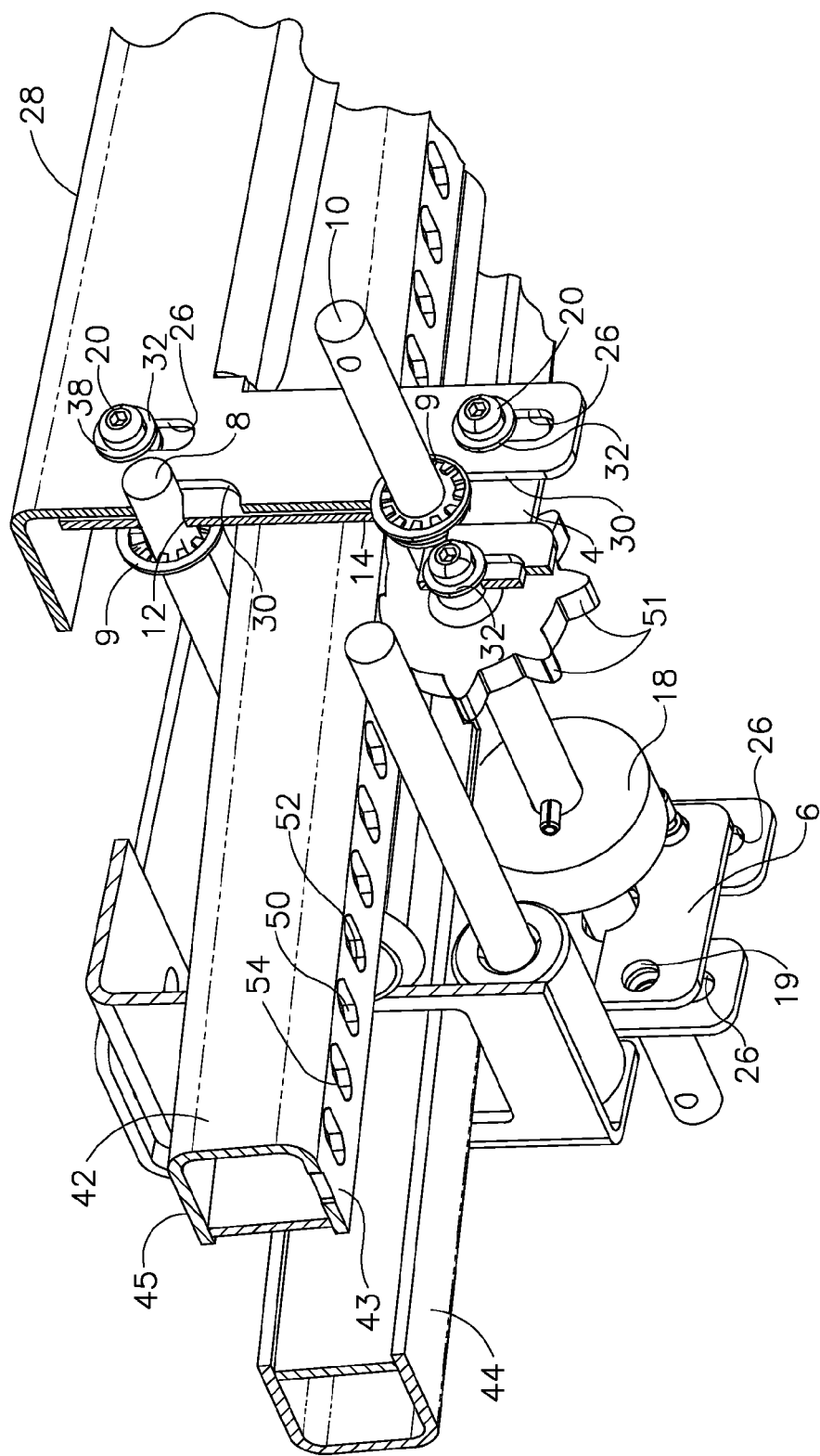
FIG. 4 is a partial sectional view of the drive mechanism when the rack is fully retracted with the slide-out room in its retracted position.

In slide-out room applications, the bracket 48 is attached to the bottom of a slide-out room 47 of a recreational vehicle (shown in broken lines in FIG. 1). The frame 28 is attached to the bottom of a room 62 of a recreational vehicle (shown in broken lines in FIG. 1). When the rack 42 and support rail 44 retract from an extended position as shown in FIG. 3, toward the frame 28 into a retracted position as shown in FIG. 4, the rack 42 and support rail 44 are raised vertically. This vertical movement is due to the slide-out riding over the floor of the main living quarters of the recreational vehicle. As the room shifts upwardly, the rack 42 and support rail 44 necessarily follow the room upward. The engagement block 2 moves upward at the same time. Slots 30 allow the engagement shaft 8 and gear shaft 10 to move vertically in the frame 28. Slots 26 allow the shoulder bolts 20 and side plates 4, 6 to move vertically in the frame 28. FIG. 4 shows the position of the engagement block 2 when the rack is fully retracted. In the fully retracted position, the engagement block 2 and shafts 8, 10 are at or near the top of their respective slots 30, and the shoulder bolts 20 are at or near the top of their respective slots 26. When the rack is fully extended, as shown in FIG. 3, the shafts 8, 10 are at or near the bottom of their respective slots 30, and the shoulder bolts 20 are at or near the bottom of their respective slots 26. The side plates 4, 6 maintain the engagement shaft 8 and the gear shaft 10 at a constant distance apart, which is to assure constant driving contact between gear 16 and rack 42 and supporting contact between roller 18 and rail 44. Since the engagement shaft 8 and gear shaft 10 are maintained at a constant distance and allowed to float within the frame 28, the gear 16 remains constantly engaged with the rack 42 as the rack 42 moves vertically. Constant engagement of the gear 16 with the rack 42 ensures no slippage between the gear 16 and rack 42.

The invention described above is not to be limited to the details given, but may be modified within the scope of the following claims.

What is claimed is:

1. A drive mechanism for an extendable member comprising:
   a first side plate;
   a second side plate opposite said first side plate;
   a rack having a first surface and a second surface and being located between said plates;
   an engagement shaft extending between said first side plate and second side plate and contacting said second surface of said rack;
   a gear shaft extending between and supported by said first side plate and said second side plate such that said gear shaft is restrained from relative movement with respect to said engagement shaft, said gear shaft carrying a gear, said gear engaging said first surface of said rack such that upon rotation of the gear said rack is moved longitudinally between said plates;
   a rail located between said plates paralleling said rack, said gear shaft carrying a support roller contacting and supporting said rail; and
   a frame slidably retaining said first and second side plates for vertical movement of the plates and said supported shafts and said rack relative to the frame with said gear and said first surface of the rack remaining in engagement, said frame restricting lateral movement of the rack.

2. The drive mechanism of claim 1 wherein said rack and rail are connected for joint movement.

3. The drive mechanism as claimed in claim 1, wherein said first and second side plates contain bolts, said frame has slots, said bolts extending through said slots in said frame allowing said vertical movement of said rack while maintaining said gear in engagement with said rack.

4. The drive mechanism as claimed in claim 1, wherein said rack includes a plurality of longitudinally spaced openings, said gear including teeth, at least one of said teeth extending into one of said openings in said rack so as to restrict lateral movement of said rack relative to said gear, to provide a driving force and to move said rack longitudinally.

5. A drive mechanism for an extendable member comprising:
   a frame connected to a recreational vehicle, said frame carrying a rack, said rack connected to a slide-out room carried by said recreational vehicle and having a first surface and second surface;
   an engagement member including an engagement shaft contacting said second surface of said rack;
   a gear shaft carrying a gear, said gear shaft and said engagement member carried between side plates, said side plates slidably retained by said frame for movement between upper and lower positions relative to said frame with said engagement shaft and said gear including said gear shaft; and
   said gear engaging said first surface of said rack for imparting movement of the rack relative to said engagement member between retracted and extended positions, said frame slidably retaining said engagement member and said gear in contact with said rack for movement of the engagement member, said gear and the rack movable between said upper and said lower positions as said rack moves between its said retracted and extended positions.

6. The drive mechanism as claimed in claim 5, and a rail carried by said frame paralleling said rack, a roller carried by said gear shaft supporting said rail.

7. The drive mechanism as claimed in claim 6, wherein said rack and rail are connected together for joint movement.

8. The drive mechanism as claimed in claim 5 wherein a rail is joined to said rack in a substantially parallel orientation to said rack, said gear shaft including a roller in rolling contact with said rail.

\* \* \* \* \*